(12) United States Patent
Dede et al.

(10) Patent No.: US 9,231,309 B2
(45) Date of Patent: Jan. 5, 2016

(54) METAMATERIAL MAGNETIC FIELD GUIDE

(75) Inventors: Ercan Mehmet Dede, Ann Arbor, MI (US); Jaewook Lee, Goyang (KR)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 577 days.

(21) Appl. No.: 13/559,850

(22) Filed: Jul. 27, 2012

(65) Prior Publication Data
US 2014/0028424 A1   Jan. 30, 2014

(51) Int. Cl.
  *H01Q 15/00*  (2006.01)
  *H01F 5/00*   (2006.01)
  *H02K 1/02*   (2006.01)

(52) U.S. Cl.
  CPC ........... *H01Q 15/0086* (2013.01); *H01F 5/003* (2013.01); *H01Q 15/0026* (2013.01); *H02K 1/02* (2013.01)

(58) Field of Classification Search
  CPC .................. H01Q 15/0026; H01Q 15/0086
  USPC .......... 324/319, 320; 343/909; 335/210, 229, 335/301; 250/396 ML; 359/642; 336/84 M, 336/177; 428/611, 900, 692.1; 310/191, 310/216.076
  See application file for complete search history.

(56) References Cited

U.S. PATENT DOCUMENTS

| | | | |
|---|---|---|---|
| 1,161,819 A | 11/1915 | Grob | |
| 1,768,907 A | 7/1930 | Heinkel | |
| 1,817,763 A | 8/1931 | Purington | |
| 1,834,431 A | 12/1931 | Smith | |
| 2,540,022 A | 1/1951 | Rabenda | |
| 2,859,298 A | 11/1958 | Burch | |
| 2,911,605 A * | 11/1959 | Wales, Jr. | 336/200 |
| 3,281,739 A | 10/1966 | Grengg | |
| 3,469,180 A * | 9/1969 | Anderson | 324/320 |
| 3,622,869 A * | 11/1971 | Golay | 324/320 |
| 3,735,306 A * | 5/1973 | Kabler et al. | 336/192 |
| 3,772,540 A | 11/1973 | Benson | |
| 3,987,646 A | 10/1976 | Knourek et al. | |
| 4,010,390 A | 3/1977 | Stampfli | |
| 4,030,056 A | 6/1977 | Patz | |
| 4,216,454 A | 8/1980 | Ohtani et al. | |
| 4,327,345 A | 4/1982 | Kelso et al. | |
| 4,381,490 A | 4/1983 | Peters | |
| 4,642,501 A | 2/1987 | Kral et al. | |
| 4,651,118 A | 3/1987 | Zeuner et al. | |
| 4,658,231 A | 4/1987 | Schwenzer et al. | |
| 4,698,537 A | 10/1987 | Byrne et al. | |
| 4,700,097 A | 10/1987 | Kawada et al. | |

(Continued)

OTHER PUBLICATIONS

Grbic, A. et al.,"Near-Field Plates: Subdiffraction Focusing with Patterned Surfaces," Science, vol. 320, pp. 511-513, Apr. 25, 2008.

(Continued)

*Primary Examiner* — Burton Mullins
(74) *Attorney, Agent, or Firm* — Dinsmore & Shohl LLP

(57) ABSTRACT

A magnetic field manipulation apparatus comprises a metamaterial structure, the metamaterial structure including a multilayer stack of metamaterial layers, each metamaterial layer including a substrate supporting one or more conductive loops. The metamaterial structure may be configured to redirect the magnetic flux around the metamaterial structure, and in some examples concentrated into a gap between two adjacent metamaterial structures. An apparatus may further include a magnetic field source such as an electromagnet.

15 Claims, 4 Drawing Sheets

(56) References Cited

U.S. PATENT DOCUMENTS

| | | | |
|---|---|---|---|
| 4,751,415 A | 6/1988 | Kitamori et al. | |
| 4,791,370 A * | 12/1988 | MacKinnon | 324/318 |
| 4,849,666 A | 7/1989 | Hoag | |
| 4,918,831 A | 4/1990 | Kliman | |
| 4,967,464 A | 11/1990 | Stephens | |
| 5,079,664 A | 1/1992 | Miyaguchi | |
| 5,138,291 A | 8/1992 | Day | |
| 5,166,619 A * | 11/1992 | Ries | 324/318 |
| 5,220,228 A | 6/1993 | Sibata | |
| 5,239,277 A | 8/1993 | Vielot | |
| 5,428,257 A | 6/1995 | Lurkens | |
| 5,578,979 A * | 11/1996 | Adams et al. | 335/245 |
| 5,579,024 A * | 11/1996 | Sureau | 343/909 |
| 5,608,369 A | 3/1997 | Irgens et al. | |
| 5,668,430 A | 9/1997 | Kolomeitsev | |
| 5,747,912 A | 5/1998 | Sakuma et al. | |
| 5,781,090 A | 7/1998 | Goloff et al. | |
| 5,844,346 A | 12/1998 | Kolomeitsev et al. | |
| 5,852,335 A | 12/1998 | Suzuki et al. | |
| 5,886,605 A | 3/1999 | Ulerich et al. | |
| 5,890,662 A | 4/1999 | Dykstra | |
| 5,945,761 A | 8/1999 | Sakuma | |
| 5,955,934 A | 9/1999 | Raj | |
| 5,969,589 A | 10/1999 | Raj | |
| 6,002,233 A | 12/1999 | McCann | |
| 6,066,904 A | 5/2000 | Fei et al. | |
| 6,072,260 A | 6/2000 | Randall | |
| 6,087,752 A | 7/2000 | Kim et al. | |
| 6,093,993 A | 7/2000 | McClelland | |
| 6,232,693 B1 | 5/2001 | Gierer et al. | |
| 6,249,198 B1 | 6/2001 | Clark et al. | |
| 6,501,359 B2 | 12/2002 | Matsusaka et al. | |
| 6,624,538 B2 | 9/2003 | Janisiewicz et al. | |
| 6,657,348 B2 | 12/2003 | Qin et al. | |
| 6,720,686 B1 | 4/2004 | Horst | |
| 6,731,191 B2 | 5/2004 | Lang et al. | |
| 6,816,048 B2 | 11/2004 | Morita et al. | |
| 6,859,114 B2 | 2/2005 | Eleftheriades et al. | |
| 6,867,525 B2 * | 3/2005 | Ionel et al. | |
| 6,933,812 B2 * | 8/2005 | Sarabandi et al. | 333/219 |
| 6,938,325 B2 * | 9/2005 | Tanielian | 29/602.1 |
| 6,960,862 B2 | 11/2005 | Hill | |
| 6,965,625 B2 * | 11/2005 | Mross et al. | 372/74 |
| 6,967,424 B2 | 11/2005 | Popov | |
| 7,014,168 B2 | 3/2006 | Shimura et al. | |
| 7,034,427 B2 | 4/2006 | Hirzel | |
| 7,106,494 B2 * | 9/2006 | Osipov et al. | 359/299 |
| 7,116,030 B2 | 10/2006 | Torok | |
| 7,182,051 B2 | 2/2007 | Sedda et al. | |
| 7,190,325 B2 * | 3/2007 | Nagy | 343/909 |
| 7,205,685 B2 | 4/2007 | Reichert et al. | |
| 7,350,763 B2 | 4/2008 | Hofling | |
| 7,420,308 B2 | 9/2008 | Ramu et al. | |
| 7,511,597 B2 | 3/2009 | Sata et al. | |
| 7,522,124 B2 * | 4/2009 | Smith et al. | 343/909 |
| 7,560,835 B2 | 7/2009 | Groening et al. | |
| 7,593,170 B2 * | 9/2009 | Wu et al. | 359/719 |
| 7,629,941 B2 * | 12/2009 | Pendry et al. | 343/851 |
| 7,661,653 B2 | 2/2010 | Kondoh | |
| 7,710,225 B2 | 5/2010 | Uni | |
| 7,777,594 B2 * | 8/2010 | Eleftheriades | 333/134 |
| 7,786,641 B2 | 8/2010 | Nishijima | |
| 7,982,567 B2 | 7/2011 | Cartier Millon et al. | |
| 8,003,965 B2 | 8/2011 | Grbic et al. | |
| 8,013,316 B2 | 9/2011 | Eleftheriades | |
| 8,013,698 B2 | 9/2011 | Bonjean et al. | |
| 8,570,128 B1 | 10/2013 | Dede et al. | |
| 8,729,898 B2 * | 5/2014 | Price et al. | 324/319 |
| 8,780,010 B2 * | 7/2014 | Sanada | 343/895 |
| 9,013,068 B2 * | 4/2015 | Ryu et al. | 307/104 |
| 2002/0057153 A1 | 5/2002 | Matsusaka et al. | |
| 2004/0155545 A1 | 8/2004 | Kaplan et al. | |
| 2006/0086396 A1 | 4/2006 | Ando | |
| 2006/0272714 A1 | 12/2006 | Carrillo et al. | |
| 2007/0152790 A1 | 7/2007 | Telep | |
| 2007/0267922 A1 | 11/2007 | Uni | |
| 2008/0276889 A1 | 11/2008 | Sfaxi et al. | |
| 2009/0021334 A1 | 1/2009 | Okada | |
| 2009/0040132 A1 * | 2/2009 | Sridhar et al. | 343/911 R |
| 2009/0065615 A1 | 3/2009 | Mizui et al. | |
| 2009/0167119 A1 | 7/2009 | Nakayama et al. | |
| 2009/0230333 A1 | 9/2009 | Eleftheriades | |
| 2009/0237014 A1 | 9/2009 | Yamada | |
| 2009/0303154 A1 | 12/2009 | Grbic et al. | |
| 2010/0008009 A1 | 1/2010 | Cartier-Millon et al. | |
| 2010/0052455 A1 | 3/2010 | Feng et al. | |
| 2010/0148598 A1 | 6/2010 | Kim et al. | |
| 2010/0231433 A1 | 9/2010 | Tishin et al. | |
| 2010/0264770 A1 | 10/2010 | Braun et al. | |
| 2010/0282223 A1 | 11/2010 | Czimmek et al. | |
| 2011/0133568 A1 * | 6/2011 | Wang et al. | 307/104 |
| 2011/0156492 A1 * | 6/2011 | Ryu et al. | 307/104 |
| 2011/0170267 A1 * | 7/2011 | Ando | 361/748 |
| 2012/0206001 A1 | 8/2012 | Lee et al. | |
| 2012/0206226 A1 | 8/2012 | Lee et al. | |

OTHER PUBLICATIONS

Grbic, A. et al., "Near-Field Focusing Plates and Their Design,"IEEE Transactions on Antennas and Propagation, vol. 56, No. 10, pp. 3159-3165, Oct. 2008.

Imani, M., et al., "Near-Field Focusing With a Corrugated Surface," IEEE Antennas and Wireless Propagation Letters, vol. 8, pp. 421-424, 2009.

Lee, J., et al., "Topology optimization of switched reluctance motors for the desired torque profile," Struc Multidisc Optim, 42:783-796 (2010).

Mote, R.G. et al., "Near-field focusing properties of zone plates in visible regime—New insight," Optics Express, 16 (13): 9554-9564, 2008.

Li, J. et al., "The influence of propagating and evanescent waves on the focusing properties of zone plate structures," Optics Express, 17(21): 18462-18468, 2009.

U.S. Appl. No. 13/172,109, titled "Focusing Device Forlow Frequency Operation".

U.S. Appl. No. 13/492,087, titled "Magnetic Field Manipulation Devices and Actuators Incorporating the Same".

U.S. Appl. No. 13/206,982, titled "Three Dimensional Magnetic Field Manipulation in Electromagnetic Devices".

* cited by examiner

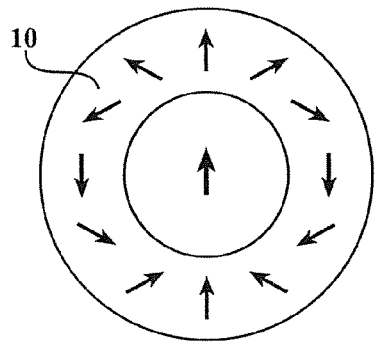 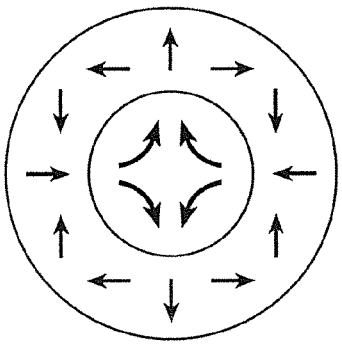 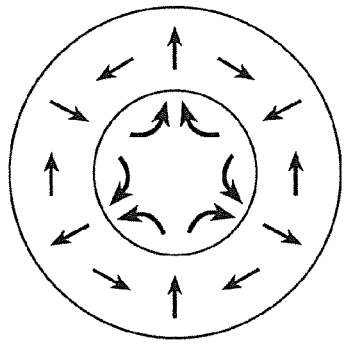
FIG. 1A  FIG. 1B  FIG. 1C
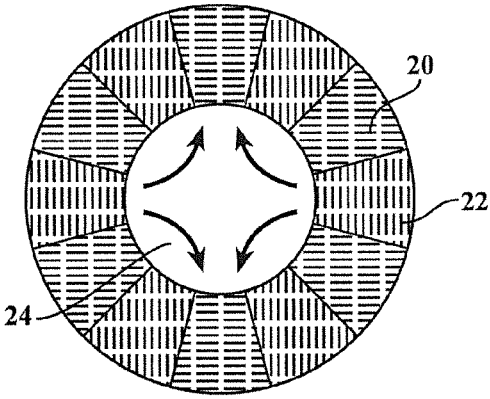
FIG. 2
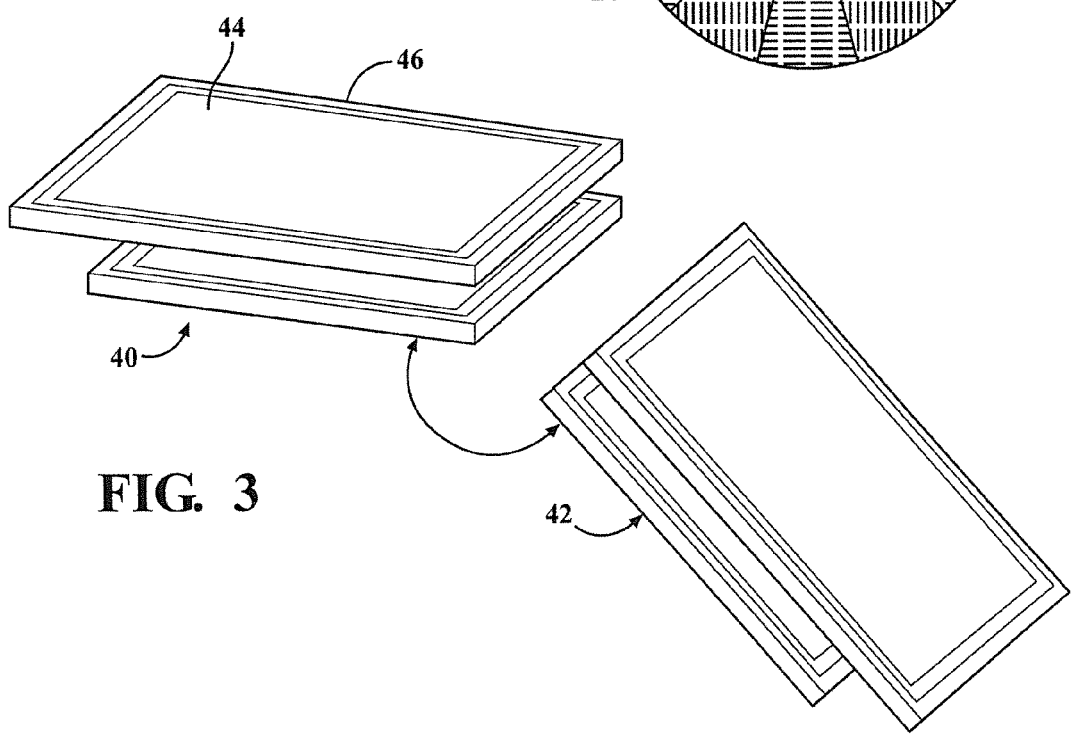
FIG. 3

METAMATERIAL MAGNETIC FIELD GUIDE

FIELD OF THE INVENTION

The invention relates to magnetic apparatus, including apparatus and methods for manipulating magnetic field distributions.

BACKGROUND OF THE INVENTION

Permanent magnets can be arranged to create various magnetic field patterns. An example is the Halbach array, in which a number of permanent magnets are arranged adjacent each other, having magnetic fields directions for each permanent magnet arranged in a particular configuration. The permanent magnet array may have an unusual magnetic field pattern, in which the flux lines are concentrated on one side of the array. However, assembling permanent magnets can be a difficult and expensive proposition, and is not practically possible in many applications. It would be useful in numerous applications to achieve similar magnetic field manipulation and flexible control of control of flux directions, without the need to assemble a multitude of permanent magnets.

SUMMARY OF THE INVENTION

Examples of the present invention include metamaterials arranged to achieve a desired magnetic field modification. In some examples, a metamaterial structure includes a stack of metamaterial layers which allows magnetic fields to be manipulated, for example redirected or concentrated in a desired direction. Unlike conventional Halbach arrays, example metamaterial structures do not include a permanent magnet. An external magnetic field source is used to provide an input magnetic field, and one or more metamaterial structures are used to obtain a desired field configuration.

In some examples, a metamaterial structure includes a multilayer stacked metamaterial. Each metamaterial layer includes one or more electrically conductive loops supported on a substrate. The loops may be formed from metal, such as gold, silver, aluminum, copper, alloys, a conducting polymer, or any other conducting material. The substrates are preferably a low magnetic permeability and low electrical conductivity material, such as plastic or epoxy resin. An example plastic is nylon, though many other plastics may be used.

Each substrate layer may support one or more conductive loops, such as an array of loops, or a single loop around the periphery of the layer. The metamaterial structure then comprises a multilayer structure including a plurality of substrates. By positioning the loops, the path of a magnetic field through the apparatus can be configured so that the magnetic field is guided along a desired path.

A metamaterial layer may be configured in the form of a near field plate. A plurality of metamaterial layers, in the form of near field plates may be stacked and otherwise arranged to create a desired path for a magnetic field. For conciseness, the term "plate" may be used to refer to a metamaterial layer including at least one conductive loop, and the term "structure" may be use to refer to an arrangement of plates, such as a multilayer of stacked near field plates.

The magnetic field path is determined by the orientation and positioning of the conductive loops within the near field plates. The plates may be stacked so as to form a plane, ring, sphere, or other shape, such as a geometric shape, so as to obtain a desired field profile. For example, a magnetic field may be converged, focused, isolated, concentrated (or focused), diverged, or guided along a preferred direction.

The input magnetic field may be provided by a conventional magnetic source, such as a permanent magnet or preferably an electromagnet. The magnetic source may be any conventional magnetic source providing a normal field configuration. However, using metamaterial structures such as the stacked plates in examples of the present invention, the magnetic field distribution may be modified as desired.

The metamaterial structures may be configured to prevent magnetic flux passing through the structures. As such, the magnetic flux tends to be redirected around the periphery of the structures. Magnetic fields may be squeezed or focused within a gap region between adjacent structures.

Examples of the present invention may replace permanent magnet based Halbach arrays wherever such conventional arrays are used, for example using a single magnetic field source and a metamaterial structure configured to achieve a desired field arrangement.

Examples of the present invention include improved motors, such as improved AC brushless motors. In a motor application, a cylindrical arrangement of conductive loops is used to concentrate a magnetic field within the bore of the cylinder. Further, the magnetic field profile may be configured to provide improved motor operation, for example in improved induction motors.

BRIEF DESCRIPTION OF THE FIGURES

FIGS. 1A-1C show cylindrical configurations in which the central magnetic field may be configured as desired.

FIG. 2 illustrates the orientation of conductive loops within a cylindrical arrangement.

FIG. 3 illustrates stacks of conductive loops supported by a substrate, the arrangement having two stacks having a predetermined orientation to each other.

DETAILED DESCRIPTION OF THE INVENTION

Figure 4:
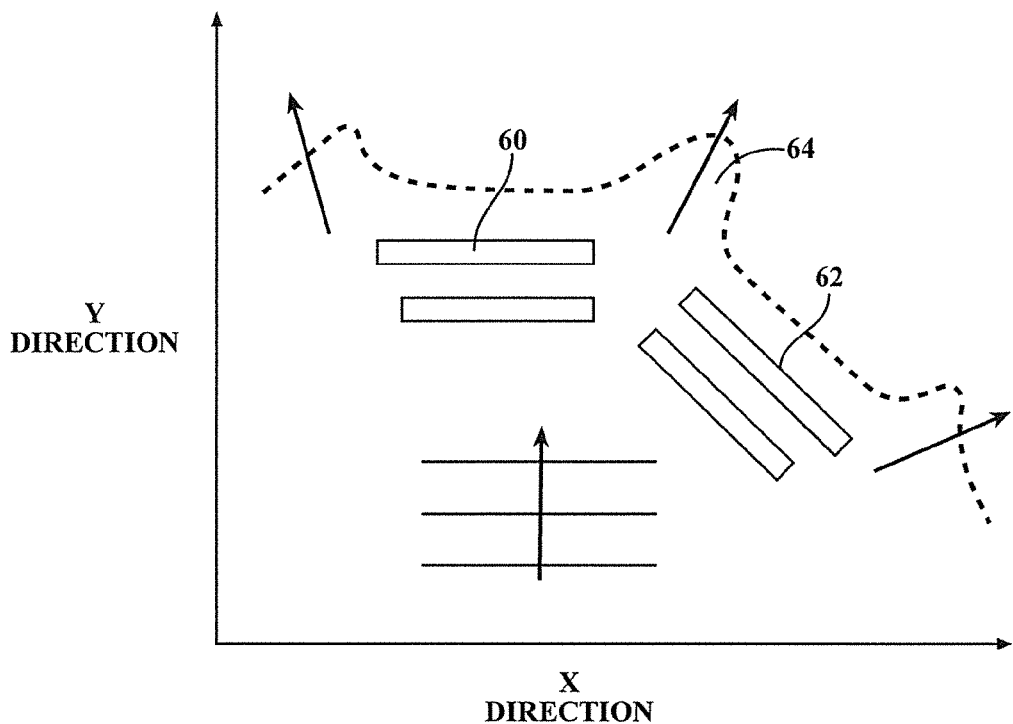
FIG. 4 is a simplified figure showing modification of an incoming magnetic field by the stacked metamaterial plates.

Examples of the present invention include magnetic field modification devices, and methods of modifying a magnetic field profile.

Example devices include stacked near field plates. A near field plate is, in some examples, a thin grating-like device that can manipulate electromagnetic waves. An example plate may be an impedance sheet that has a modulated surface reactance. When a magnetic field encounters a plate, the field distribution is modified to achieve a determined configuration.

A near field plate may include a plurality of conductive loops formed on a nonmagnetic substrate. For example metal conductive loops can be formed on a substrate by conventional lithography, for example in the form of printed circuit board elements. In some examples, the dielectric substrate is not required, and the loops may be held in place by any suitable nonmagnetic support structure. Examples of the present invention can achieve remarkable magnetic field distributions that previously were only obtained using a conventional permanent magnet Halbach array. However, there is no need for any particular special arrangement of permanent magnets in examples of the present invention.

A near field plate may be considered as being a metamaterial, as the loop dimensions may be somewhat less than the wavelength of the incident electromagnetic radiation. Near field plates may be stacked, to achieve a stacked metamaterial element. Such devices allow magnetic field guiding over relatively short distances, for example distances appreciably less than the electromagnetic wavelength. Magnetic fields may be manipulated in a manner similar to that achievable using conventional Halbach arrays, without the necessity of complicated permanent magnet arrangements.

Examples of the apparatus include confinement, isolation, focusing, guiding, or any desired profile achievement from an input magnetic field.

Examples of the present invention include improved electric motors. Various types of electric motor may include a pole piece, in which the pole of the motor produces a magnetic field that interacts with a second element. For example, the pole piece may be part of a stator, or in some examples part of a rotor. The magnetic field may be provided by permanent magnets, or in some examples by an electromagnet. The behavior of a motor may be sensitive to the magnetic field profile at the poles. Using examples of the present invention, the magnetic field profile at or near the pole may be modified to achieve improved motor performance.

Examples of the invention include stacks of near field plates. An apparatus may include a plurality of such stacks. The stacks may be arranged at a relative angular orientation, so that the planes of conductive loops have a similar relative orientation. The conductive loops may be circular, square, rectangular, or other enclosed loop form, and may be formed on a substrate as a printed or otherwise formed conductive track. The conductive track may be metal, such as copper, aluminum, silver, gold, or other metal. In some examples the conducting track may be a conducting polymer. The substrate is preferably nonmagnetic and not electrically conductive, and may be any plastic or epoxy suitable for use in the application environment. For example in an electric motor, a plastic may be chosen that is not susceptible to the high temperatures. Nylon was found to be a good example, though many other plastics or even circuit board materials may be used. The substrate may also be a ceramic, glass, other insulating material, or in some cases may be replaced by a non-planar support structure operable to hold the conductive loops in a desired orientation.

Multiple stacked plates may be arranged in a cylindrical arrangement, or in a linear arrangement, or in some cases in a generally spherical arrangement.

FIGS. 1A-1C illustrate a cylindrical arrangement that may be achieved using stacked plates. As illustrated, the figures may also represent a cylindrical Halbach arrangement of permanent magnets. However, in examples of the present invention, no permanent magnets are required in the cylindrical structure.

FIG. 1A shows an arrangement which generates a concentrated uniform magnetic field within the central circular bore of the cylinder. FIGS. 1B and 1C show arrangements that achieve more complex magnetic field arrangements. In the figures, conventionally the arrows would represent the field direction of a component permanent magnet. However, in examples of the present invention the arrows, such as 10, represent a surface normal to a generally planar conductive loop. The ring arrangement includes a plurality of metamaterial structures, each structure including loops generally aligned in the same direction, with adjacent structures having loops that are angularly offset from each other. In some examples, the metamaterial layers increase in size (as measured in a generally tangential direction) as the radial distance from the central bore increases, so that each metamaterial structure has a segmental shape. All conductive loops within a particular metamaterial structure may have the same orientation, for example being supported on parallel metamaterial layers. In the illustrated ring structure, each metamaterial structure has two neighboring structures, the conductive loops of neighboring metamaterial structures having different (e.g. orthogonal) orientations.

For example, in FIG. 1B, a topmost segment may include loops arranged in the vertical direction (as illustrated and not limiting). Adjacent segments have loops arranged in the horizontal plane, as shown by the arrow directions. Going around the loops, each structure has loops at right angles (i.e. orthogonal) to loops within neighboring adjacent structures. The ring can be formed by a plurality (in FIGS. 1A-1C, twelve) of metamaterial structures, each a multilayer stack forming (at least approximately) a segment of the ring structure. The segment dimensions may be generally equal.

FIG. 2 shows an arrangement of conductive loops 20 arranged in segments 22 around a central bore 24. The conductive loops are shown as lines, representing an edge-on view. The conductive loops may be supported on a multilayer substrate, and comprise arrays of loops stacked on top of each other. In practice, it may be difficult to achieve the exact segmental arrangement of loops shown in FIG. 2. The segments may be approximated by stacks of similarly sized substrates, or the substrate size may vary as a function of position within the stack to more closely approximate the segmental configuration, for example by increasing in size as the radial distance from the central axis or bore increases. Metamaterial layers may become larger moving away from the central axis, so the outer layers are larger. This may form a wedge-like multilayer arrangement, approximating a segmental form.

FIG. 3 shows a pair of stacks 40 and 42 at a designed orientation. Each stack is a two-layer stack, including a substrate such as shown at 44, the substrate supporting a conductive loop as shown at 46. In examples, the substrate may support a single conductive loop, or in other examples there may be an array of conductive loops formed on the substrate. The substrates are spaced apart and generally parallel within each stack. However, there is an orientation angle between substrates within the adjacent stacks 40 and 42. An arrangement of stacks such as shown in FIG. 3 may be arranged around a cylindrical form, so as to approximate the arrangement of FIG. 2. In other examples discussed further below, such stacks may be arranged in a generally spherical or other arrangements. There may be a plurality of plates within each stack; only two layers are shown in FIG. 3 for illustrative convenience, though the number of plates within each stack may be much greater than shown.

FIG. 4 is a simplified schematic showing an incoming magnetic field, generally having a planar wave front incident on a pair of stacks shown at 60 and 62. This may correspond to the arrangement shown in FIG. 3. In this example, the magnetic field tends to be guided between the gaps between the two metamaterial structures (or stacks). For example, a concentrated magnetic field is formed at 64 within the gap region between the first and second stacks.

Figure 5:
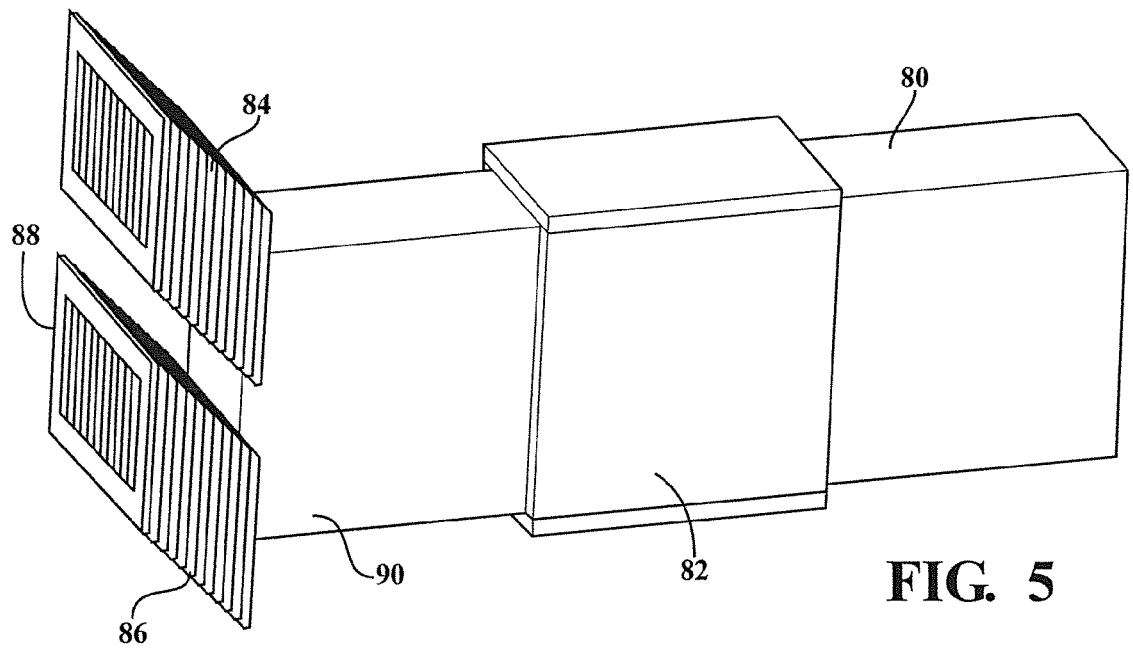
FIG. 5 shows a motor pole example including an iron yoke, coil, and stacked metamaterial plates at a pole region.

FIG. 5 shows an iron yoke 80 with an AC coil 82 formed around it. This arrangement may be found within the pole pieces of reluctance motors and other forms of AC electric motors. Conventionally, a magnetic field emerges from the pole tip region of the yoke 90, which would be the end of the yoke and includes the end face of the pole. In examples of the present invention, stacked near field plates are formed on the pole region to modify the magnetic field emerging from the pole. The figure shows first and second stacks 84 and 86, each including a plurality of conductive loops, such as 88. In this example, no substrate is required. The conductive loops may be separated from each other by a dielectric layer, or in some examples the dielectric layer may be omitted. In some examples, the stack generally registers the conductive loops with each other so that an overall rectangular form factor is obtained.

In the illustration of FIG. 5, the loops are shown with a relative offset from one layer to the next, which directs the magnetic field at an oblique orientation to the pole piece. This has not been achieved before using metamaterial approaches. This also provides a helpful illustration of the arrangement of conductive loops. However, in other examples, it is not necessary that this relative offset between the loops is used. A metamaterial structure may include loops that may be stacked in register in a column, or a tilted column created by lateral offsets between adjacent loops as shown in FIG. 5.

Figure 6A:
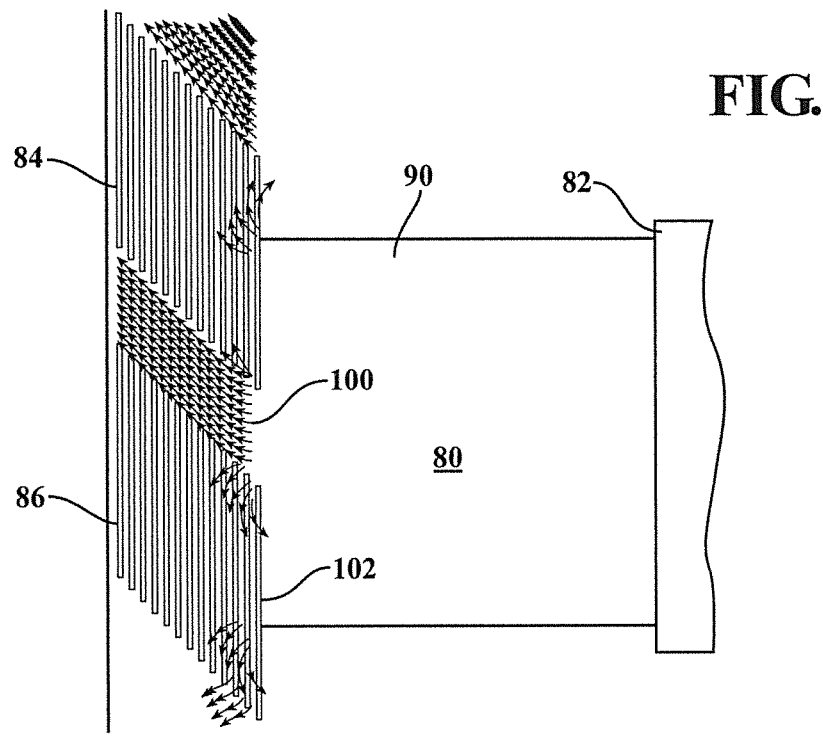
FIGS. 6A and 6B show numerical results from the configuration of FIG. 5, showing the magnetic field with and without the stacked metamaterial plates.

FIG. 6A shows the modified field profile obtained from the pole region of the iron yoke using the stacked metamaterial plates. The magnetic field is relatively concentrated within the center of the pole region at 100 and is relatively low within the areas of the pole region covered by the conducting plates, for example around 102. Further, the direction of the concentrated magnetic field is directed at an oblique angle to the axis of elongation of the magnetic yoke. For example, the direction of the concentrated magnetic field may be arranged between 10 and 45 degrees to the surface normal of the end face 102, though this is not limiting.

Figure 6B:
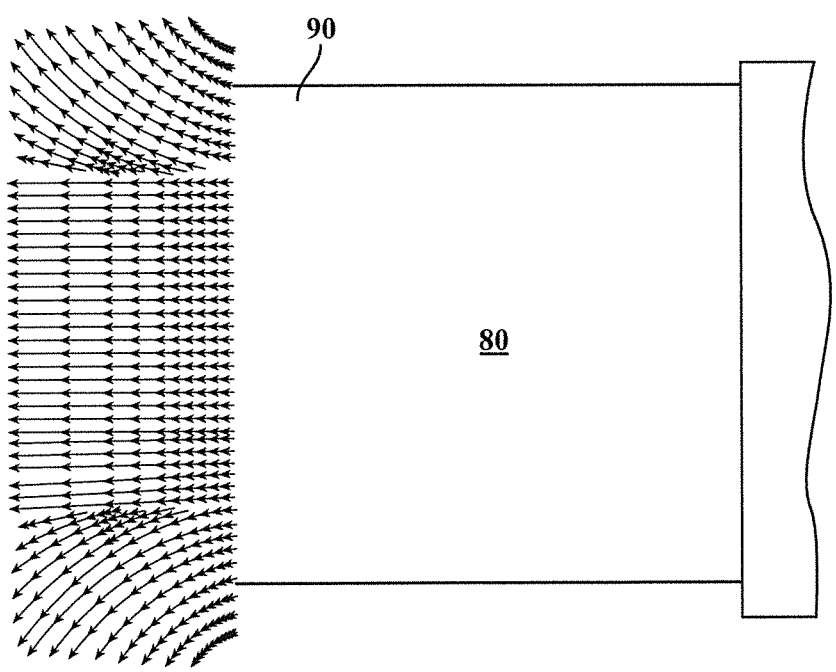

For comparison FIG. 6B shows the pole region of the yoke 80 forming the conventional unmodified magnetic field at the end of the pole region 90.

It has been shown that concentrating the magnetic field within the center of the pole region allows improved performance of an electric motor. In some examples of the present invention, stacked metamaterial plates are used to modify the field profile of motor poles.

Figure 7:
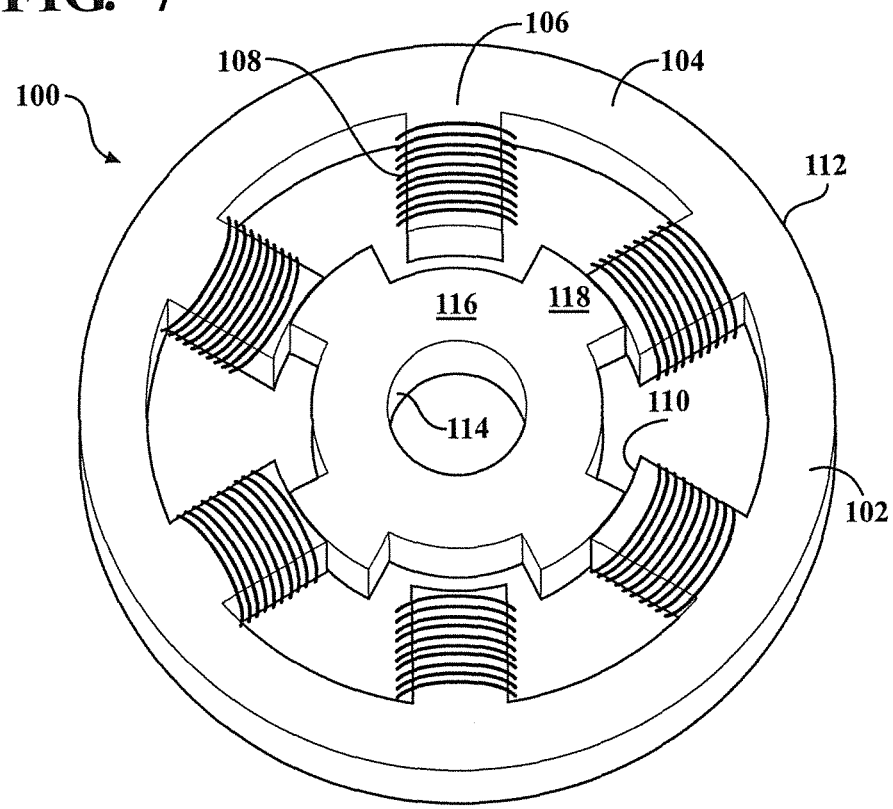
FIG. 7 shows an improved switched reluctance motor.

FIG. 7 illustrates an improved switched reluctance motor comprising a rotor, including a central rotor portion supporting a plurality of outwardly extending rotor poles, and a stator, including stator poles extending inwardly towards the rotor. The switched reluctance motor 100 comprising a stator 102 including an annular stator portion 104 and stator poles 106 extending inwardly from the annular stator portion 104. Each stator pole 106 has a pole tip 110, and a stator coil such as coil 108 is wound around each stator pole 106. One or more metamaterial stacks are supported on each pole tip, for example supported on pole tip 110 (the metamaterial stack is not shown here in detail). The metamaterial stack creates a region 112 of modified magnetic field flux near the pole tip 110. The annular portion need not have a circular outer cross-section, but may be configured in any suitable arrangement for supporting the inwardly directed poles. An annular stator portion may have an outer diameter in the range 1 cm-1 m, for example in the range 5-20 cm. However, such dimensions are exemplary and not limiting.

Each stator pole has a stator pole tip and an associated stator coil, the rotor being operable to rotate within the stator on sequential energization of stator coils. Each stator pole tip supports one or more metamaterial structures configured to produce at least one concentrated magnetic flux region proximate the pole tip when the associated stator coil is energized. For example, each stator pole may have an inwardly directed end face, the one or more metamaterial structures being located at the end face. A plurality (such as two) metamaterial structures may be configured to produce a plurality of concentrated magnetic flux regions proximate the end face. For example, the magnetic field may be concentrated in the gap regions between neighboring structures, and/or around the outside of the structures.

Figure 8:
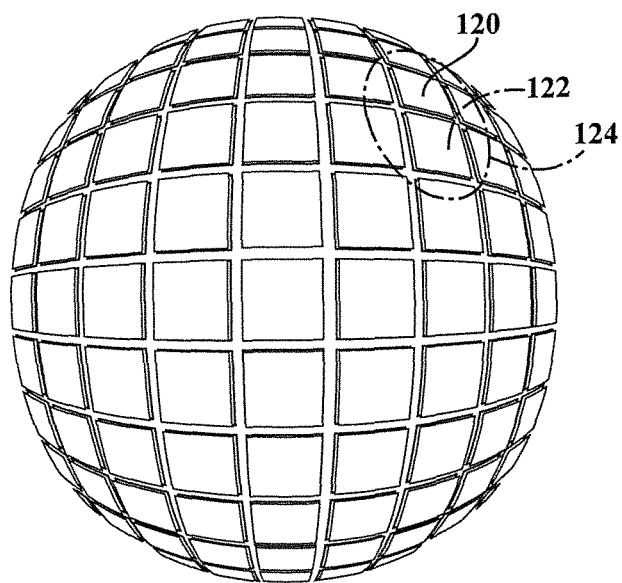
FIG. 8 shows a three-dimensional arrangement of metamaterial structures.

FIG. 8 shows a three-dimensional arrangement of metamaterial structures, such as stacked plates 120 and 122, which can be used to concentrate magnetic fields along various preferred directions. For example, the region denoted 124 may behave similarly to that shown in FIG. 4, with the magnetic field being concentrated between the gaps between adjacent structures.

Examples of the present invention include improved electric motors, such as AC electric motors, having improved torque characteristics. The improved torque is obtained through modification of magnetic fields within the motor. For example, the field extending between the stator and the rotor of an electric motor may be improved by modifying the field profiles emerging from, for example, a stator pole. Examples also include DC motors, and any type of induction motor. Examples also include reluctance motors. Other examples include electro-mechanical actuators and transducers such as stereo speakers.

Examples of the present invention also include improved actuators. An example actuator comprises an magnet body having an magnet end portion, the magnet end portion including one or more metamaterial structures, and a plunger, moveable relative to magnet end portion, having a plunger end portion, the magnet body producing a magnetic force on the plunger induced by magnetic flux extending through a gap between the magnet end portion and the plunger end portion. The one or more metamaterial structures may be configured to increase magnetic flux density within a region of the plunger end portion, so as to increase the magnetic force on the plunger. The magnet body may be an electromagnet having a coil wound around a portion of the magnet body. the coil being energized by an alternating signal source having a signal frequency, In some examples of the present invention, the magnetic field source is an electromagnet energized by an alternating electric signal, the signal frequency being in the range 50 Hz-100 kHz, more particularly in the range 100 Hz-1 kHz.

Applications of the stacked near field plates also include improved magnetic levitation devices, improved electric motors for automobile use, improved wigglers, and any improved magnetic devices where modification of magnetic field profiles allows improved performance parameters.

Examples of the present invention include apparatus and methods for manipulating a magnetic field, the magnetic field being provided by a magnetic field source, the apparatus comprising a metamaterial structure. The metamaterial structure may include a multilayer stack of metamaterials configured as near-field plates, sometimes referred to as "plates" for conciseness. Each plate may have a first side and an opposite second side, and at least one electrically conductive loop. The loop may bound a perimeter of the plate, and hence metamaterial structure. The metamaterial structure may be configured to restrict a magnetic flux of the magnetic field from passing across the metamaterial structure from the first side to the second side, the magnetic field being redirected to propagate around the perimeter of the metamaterial structure. A metamaterial may be formed from a substrate having a low magnetic permeability, such as plastic or other low permeability material. The magnetic field may be redirected to propagate around the perimeter of the metamaterial structure along an axis generally normal to a surface (or side) of a metamaterial structure, for example normal to the plate.

At least two of the metamaterial structures may be placed in close proximity to one another such that the space between the perimeters of adjacent the metamaterial structures defines a gap, the magnetic field being redirected to propagate around the perimeters of the metamaterial structures and through the gap.

The metamaterial structure may include a stack of plurality of metamaterial layers, such that the first side of one metamaterial layer is in close proximity to the second side of another metamaterial structure.

The metamaterial structures may be shaped so that the multilayer structure has a wedge or arcuate segment form. For example, structures may be arranged in a ring around a central axis, with the inner layers being smaller, the outer layers incrementally larger. The size increases may be restricted to an approximately circumferential direction. The layer size changes may be configured so that each layer subtends an approximately equal angle at the axis.

Examples of the present invention also include an array of metamaterial structures, the array configured to form a one-dimensional, two-dimensional, or three dimensional geometric shape. For example, an array of structures may be configured to form a Halbach cylinder about a central axis. The central axis may correspond to the center bore of an AC motor.

A method for manipulating a magnetic field having a source includes providing a metamaterial structure operable to reduce a magnetic flux through the metamaterial structure and redirect the magnetic field around a perimeter of the metamaterial structure, and placing the metamaterial structure within a first propagation path of the magnetic field such that a first side faces the propagation path with an opposite second side, the magnetic flux through the metamaterial structure being reduced and the magnetic field being redirected from the propagation path and around the perimeter of the metamaterial structure along a second propagation path. The second propagation path may be generally normal to the second side. A method may include introducing two of the metamaterial structures placed in close proximity to one another such that the space between the perimeters of adjacent the metamaterial structures defines a gap, the magnetic field being redirected to propagate around the perimeters of the metamaterial structures and through the gap.

In some examples, the metamaterial structures are multilayers including a stack of a plurality of layers, such that the first side of a larger outer metamaterial layer is in close proximity to the second side of a smaller inner metamaterial layer. Metamaterial structures may be configured to form a Halbach cylinder about a center bore of an AC motor.

In some examples, at least one conductive loop may be formed on a flexible substrate, such as a flexible polymer substrate, and the substrate curved around a circumferential direction around a central axis. In some examples, a substrate may be formed in curved shape, before or after formation of the conductive loops.

A substrate may be an electrically insulating sheet, such as a planar electrically insulating sheet. In some examples, the conductive loops may be formed by an etching process using printed circuit board (PCB) techniques, for example formed by etching a metal (e.g. copper) clad electrically insulating sheet, such as a laminated electrically insulating material including a layered dielectric sheets and a polyepoxide. A multilayer metamaterial may be formed as a multilayer PCB assembly. An example method of forming a metamaterial multilayer stack includes etching or otherwise forming one or more conductive loops on each of a plurality of electrically insulating substrates, and assembling the substrates into a multilayer stack, for example as a stack in which the substrates are spaced apart and parallel to each other. The metamaterial multilayer may then be mounted on or proximate a magnet or magnetic material, such as an electromagnet or the pole of a motor, to modify the spatial distribution of magnetic flux lines in the associated magnetic field.

The substrate may be an electrically insulating layer including a polymer, such as a polymer sheet or polymer-containing sheet, where the term polymer includes copolymers, terpolymers, and the like, and also includes plastics, resins (such as epoxy resins), and the like. In some examples, the substrate may be a homogenous sheet, composite (including fiber-reinforced composites), laminate (such as an epoxy bonded laminate), and may have other forms and compositions as desired.

In some examples, conductive loops may be generated in a substrate by external physical excitation, for example formation of a photoconductive conductive loop in a semiconductor substrate by irradiation by a ring-shaped or other light beam.

The invention is not restricted to the illustrative examples described above. Examples described are not intended to limit the scope of the invention. Changes therein, other combinations of elements, and other applications will occur to those skilled in the art.

Having described our invention, we claim:

1. An electromagnetic apparatus comprising:
   a magnetic field source, the magnetic field source being an electromagnet operable to provide a magnetic field when energized; and
   a metamaterial structure, the metamaterial structure including multilayer stack of metamaterial layers, each metamaterial layer including a substrate supporting one or more conductive loops, the conductive loop extending around a periphery of the substrate, wherein the magnetic field provided by the magnetic field source is modified by the metamaterial structure.

2. The electromagnetic apparatus of claim 1, the metamaterial layers being planar, spaced apart, and parallel to each other.

3. The electromagnetic apparatus of claim 1, the substrate being a polymer layer, the conductive loops being metal tracks formed on the substrate.

4. The electromagnetic apparatus of claim 1, the apparatus further including a second metamaterial structure, there being a gap between the metamaterial structure and the second metamaterial structure,
   the magnetic field being concentrated within the gap by the metamaterial structure and the second metamaterial structure.

5. The electromagnetic apparatus of claim 1, the apparatus including a plurality of metamaterial structures arranged in a ring arrangement around a central bore.

6. The electromagnetic apparatus of claim 5, the metamaterial layers increasing in size with distance from a central bore so that each metamaterial structure has a wedge shape.

7. The electromagnetic apparatus of claim 5, the conductive loops within each metamaterial structure having the same orientation.

8. The electromagnetic apparatus of claim 7, the conductive loops of neighboring metamaterial structures having different orientations.

9. The electromagnetic apparatus of claim 7, the conductive loops of neighboring metamaterial structures having orthogonal orientations.

10. The electromagnetic apparatus of claim 1, the electromagnet including a magnetic yoke having an end portion, the metamaterial structure being proximate or adjacent the end portion of the magnetic yoke.

11. The electromagnetic apparatus of claim 10, the magnetic yoke being a component of an electric motor.

12. The electromagnetic apparatus of claim 10, the magnetic yoke being a component of an electromagnetic actuator.

13. The electromagnetic apparatus of claim 1, the magnetic field being concentrated by the metamaterial structure.

14. An electromagnetic apparatus comprising:

a magnetic field source, the magnetic field source being an electromagnet operable to provide a magnetic field when energized;

a first metamaterial structure; and a second metamaterial structure, each metamaterial structure being a multilayer stack of metamaterial layers, each metamaterial layer including an electrically insulating substrate supporting a conductive loop, the conductive loop having an inner side portion, the inner side portion of both first and second metamaterial structures spaced apart from and facing each other so as to form a gap therebetween, the first and second metamaterial structures being configured so that the magnetic field is concentrated within the gap between the inner side portion of the conductive loop of the first and second metamaterial structures.

15. An electromagnetic apparatus comprising:

a magnetic field source, the magnetic field source being an electromagnet operable to provide a magnetic field when energized;

a plurality of metamaterial structures, each metamaterial structure being a multilayer stack of metamaterial layers, each metamaterial layer including an electrically insulating substrate supporting a conductive loop, the plurality of metamaterial structures being arranged in a cylindrical arrangement having a central bore therethrough, the magnetic field being concentrated within the central bore by the plurality of metamaterial structures.

* * * * *